UNITED STATES PATENT OFFICE.

OSCAR OLDBERG, OF WASHINGTON, DISTRICT OF COLUMBIA.

IMPROVEMENT IN DISINFECTING COMPOUNDS.

Specification forming part of Letters Patent No. 117,671, dated August 1, 1871.

*To all whom it may concern:*

Be it known that I, OSCAR OLDBERG, of the city and county of Washington, in the District of Columbia, have invented a new and useful Compound for Disinfecting Purposes, which I denominate "The Columbia Disinfectant," of which the following is a description:

My invention relates to a new compound especially applicable as a disinfectant for the preservation of health in cities where decomposition and putrefaction are constantly creating poisonous gases from sewers, gutters, alleys, cess-pools, and other places where garbage and filth accumulate.

My new compound is made and used either in powder or solution; and consists chiefly of four ingredients, viz.: sulphate of iron, carbolic acid, boric acid, and alum, in about the following proportions: Boric acid, one part; carbolic acid, four parts; sulphate of iron, forty parts; alum, four parts. These ingredients constitute the disinfectant of the compound, to which may be added, when used as a powder, four parts of charcoal and one hundred and twenty parts of dried earth, making in bulk about one hundred and seventy-three parts. When compounded in solution, the disinfectant is mixed with two parts of solution of chloride of zinc and forty-eight parts of water.

As disinfectants, the chemical action of carbolic acid, sulphate of iron, and alum are well known as powerful agents in destroying the noxious gases formed by the decay of organic matter, while the boric acid instantly arrests the further decomposition of the matter and thus not only renders the disinfection complete, but stays the further generation of poisonous gases a much greater length of time than can be obtained by the disinfecting compounds now in use. This property of the compound to arrest further decay is especially useful in lessening the frequency of the application of my disinfecting agent, and, therefore, greatly reduces the cost in using it, as a single application thereof will accomplish as much and last as long as several applications of such compounds heretofore used.

In its dry condition it is used for cess-pools, gutters, alleys, &c., but as a solution it is more easily used for sewers and other places not readily accessible. It can be compounded at exceedingly trifling cost, and used in any place with perfect safety. In buildings, ships, and other closed places it can be used with as much advantage as in open places.

I do not confine myself to the particular proportions herein stated, as they may be varied according to the condition of the place to be disinfected without impairing its effectiveness.

Having described my invention, I claim—

1. In a disinfecting compound, boric acid as an agent for arresting decomposition or the generation of noxious gases in the decay of organic matter, as described.

2. In a disinfecting compound, the combination, with boric acid, of carbolic acid, sulphate of iron, and alum, as and for the purpose described.

OSCAR OLDBERG.

Witnesses:
   A. E. H. JOHNSON,
   J. W. HAMILTON JOHNSON.